United States Patent

Hughes et al.

[11] Patent Number: 5,531,935
[45] Date of Patent: Jul. 2, 1996

[54] PHOTOCHROMIC NAPHTHOPYRAN COMPOUNDS

[75] Inventors: Frank J. Hughes, Edina, Minn.; Edward A. Travnicek, Coral Springs, Fla.

[73] Assignee: BMC Industries, Inc., Minneapolis, Minn.

[21] Appl. No.: 456,071

[22] Filed: May 31, 1995

Related U.S. Application Data

[62] Division of Ser. No. 282,278, Jul. 28, 1994.
[51] Int. Cl.$^6$ .............................. G02B 5/23; G02B 24/00
[52] U.S. Cl. ........................ 252/586; 549/389; 524/110
[58] Field of Search ..................... 252/586; 549/389; 524/110

[56] References Cited

U.S. PATENT DOCUMENTS

| | | | |
|---|---|---|---|
| 3,567,605 | 3/1971 | Becker | 204/158 |
| 4,931,221 | 6/1990 | Heller | 252/586 |
| 5,066,818 | 11/1991 | Gemert et al. | 549/389 |
| 5,106,998 | 4/1992 | Tanaka et al. | 549/331 |
| 5,238,981 | 8/1993 | Knowles | 524/110 |
| 5,244,602 | 9/1993 | Van Gemert | 252/589 |
| 5,274,132 | 12/1993 | Van Gemert | 549/389 |

*Primary Examiner*—Nicky Chan
*Attorney, Agent, or Firm*—Kinney & Lange

[57] ABSTRACT

A naphthopyran compound represented by the formula:

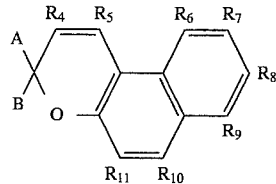

wherein $R_4$, $R_5$, $R_6$, $R_7$, $R_8$, $R_9$, $R_{10}$, and $R_{11}$ are each selected from the group consisting essentially of hydrogen, a first stable organic radical, a heterocyclic group, halogen, a first nitrogen-substituted group, and a first nitrogen-substituted ring compound; A and B are each selected from the group consisting essentially of hydrogen, substituted phenyl, and substituted naphthyl, provided that at least one of A or B is substituted phenyl or substituted naphthyl; and any substituent of any substituted phenyl or substituted naphthyl at A or B is selected from the group consisting essentially of hydrogen, a second stable organic radical, a heterocyclic group, halogen, a second nitrogen-substituted group, and a second nitrogen-substituted ring compound, provided that at least one substituent of any substituted phenyl or substituted naphthyl at either A or B is phenyl, naphthyl, or furyl.

24 Claims, No Drawings

PHOTOCHROMIC NAPHTHOPYRAN COMPOUNDS

This is a Divisional of application Ser. No. 08/282,278, filed Jul. 28, 1994.

BACKGROUND OF THE INVENTION

The present invention generally relates to naphthopyran compounds. More specifically, the present invention relates to photochromic naphthopyran compounds and to articles made of photochromic compounds.

Photochromism generally concerns the ability of a compound to reversibly change color under different light conditions. One particular type of photochromic phenomenon concerns the reversible change in color of a compound from an original color to a different color when the compound is exposed to a source of ultraviolet radiation, such as solar radiation or light radiated from a mercury lamp. The photochromic compound fades to the original color within a period of time after the compound is isolated from the ultraviolet radiation, such as by placing the compound in a dark room.

Various products, including optical lenses, incorporate the principal of photochromism. For example, photochromic compounds, such as naphthopyrans, are incorporated into plastic ophthalmic lenses to effect color changes in the plastic lenses when the lenses are exposed to particular lighting conditions. Additionally, different photochromic compounds may be blended to create a color effect that is different from the respective color effects of the individual photochromic compounds. As an example, a first photochromic compound that turns orange or red when activated by light and a second photochromic compound that turns blue when activated by light may be blended to form a photochromic mixture that produces a shade of gray when activated by light.

Several types of photochromic compounds have been reported which exhibit changes in color when exposed to ultraviolet light. One particular class of photochromic compounds includes the 3,3-disubstituted naphthopyrans. One specific group of 3,3-disubstituted naphthopyran of interest includes the 3H-naphtho[2,1b]pyrans. The color response of the 3H-naphtho[2,1b]pyrans to ultraviolet light extends to purple, red, orange or yellow, depending upon the composition and structure of the particular 3H-naphtho[2,1b]pyrans. A general expression of the 3H-naphtho[2,1b]pyrans is provided in graphical formula I:

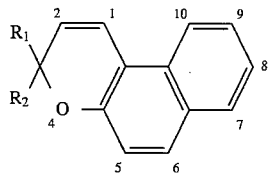

where $R_1$ and $R_2$ are substituents attached to the pyran ring at the position indicated.

Several photochromic compounds are described in U.S. Pat. No. 3,567,605 to Becker. The Becker patent describes chromenes and chromene derivatives which are photochromic at relatively low temperatures. The patent also describes chromenes and chromene derivatives which are photochromic at room temperature, such as diphenyl-3H-naphtho[2,1b]pyran, where $R_1$ and $R_2$ of formula I are each unsubstituted phenyl groups.

Additional photochromic compounds are described in U.S. Pat. No. 4,93 1,221 to Heller et al. One type of photochromic compound described in Heller generally has the form of graphical formula I with $R_1$ and $R_2$ being cyclopropyl radicals and with any of various substituents included on the naphtho portion of the naphthopyran rings. Heller reports a larger bathochromic shift in the visible spectrum of 3H-naphtho[2,1b]pyrans that include the cyclopropyl radicals as compared to 3H-naphtho[2,1b]pyrans that include alkyl groups or a spirocycloalkyl group in place of the cyclopropyl radicals.

Other photochromic compounds are described in U.S. Pat. No. 5,066,818 to Gemert et al. One photochromic compound class described in Gemert generally meets graphical formula I with one of $R_1$ and R2 being a substituted phenyl radical, with one of $R_1$ and $R_2$ being either a substituted or unsubstituted phenyl radical, and with various substituents included on the naphtho portion of the naphthopyran rings. Gemert lists various non-aryl groups as potential substituents of the phenyl radicals of $R_1$ and R2. Gemert reports a range of decolorization rates associated with the 3H-naphtho[2,1b]pyrans that include the phenyl radicals as $R_1$ and $R_2$.

Additional photochromic compounds are described in U.S. Pat. No. 5,106,998 to Tanaka et al. Tanaka describes compounds in which $R_1$ and $R_2$ of graphical formula I are alkyl groups. Tanaka also describes compounds in which, together, $R_1$ and $R_2$ of graphical formula I are either a norbornylidene radical or a bicyclo[3,3,1]9-nonylidene radical. Tanaka reports several fade times and maximum absorption wavelengths associated with various 3H-naphtho[2,1b]pyrans that include either the alkyl radicals, the norbornylidene radical or the bicyclo[3,3,1]9-nonylidene radical as $R_1$ and R2.

U.S. Pat. No. 5,238,981 to Knowles teaches a 3H-naphtho[2,1b]pyran compound in which $R_1$ and $R_2$ of graphical formula I are each selected from a group of organic radicals that includes phenyl and naphthyl. The organic radicals placed at $R_1$ and $R_2$ are either substituted or unsubstituted. Potential substituents of substituted organic radicals placed at $R_1$ and $R_2$, provided that one of the organic radicals placed at $R_1$ and $R_2$ is a phenyl group, include various non-aryl groups. Various potential substitutions on the naphtho portion of the naphthopyrans ring are taught, including an 8-methoxy substitution. Knowles states that the number eight carbon atom substitutions, such as the 8-methoxy substitution, cause a bathychromic shift in the visible spectrum associated with activated forms of the 3H-naphtho[2,1b]pyrans and in the ultraviolet spectrum of unactivated forms of the 3H-naphtho[2,1b]pyrans.

Additional photochromic compounds are described in U.S. Pat. No. 5,244,602 to Van Gemert. Van Gemert describes 3H-naphtho[2,1b]pyrans in which $R_1$ and $R_2$ of graphical formula I are each phenyl, naphthyl, various heterocyclic groups, and certain non-aryl groups. Van Gemert also discusses substitution of various non-aryl substituents into any phenyl, naphthyl, heterocyclic, and non-aryl groups placed at $R_1$ and $R_2$. Van Gemert also states that certain substitutions at the number 5 carbon on the naphtho ring causes a bathychromic shift of the absorption maximum of the 3H-naphtho[2,1b]pyrans.

U.S. Pat. No. 5,274,132 to Van Gemert describes certain 3H-naphtho[2,1b]pyrans in which $R_1$ of graphical formula I is a phenyl group, a naphthyl group, a furyl group, or a thienyl group and in which $R_2$ of graphical formula I is an arylalkenyl radical. Van Gemert describes a bathychromic shift associated with the 3H-naphtho[2,1b]pyrans that include the arylalkenyl radical relative to certain other naphthopyrans disclosed in U.S. Pat. No. 3,567,605.

SUMMARY OF THE INVENTION

The present invention includes a naphthopyran compound represented by the formula:

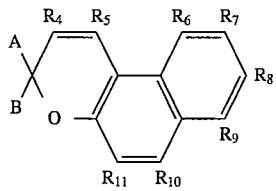

wherein $R_4$, $R_5$, $R_6$, $R_7$, $R_8$, $R_9$, $R_{10}$, and $R_{11}$ are each selected from the group consisting essentially of hydrogen, a first stable organic radical, a heterocyclic group, halogen, a first nitrogen-substituted group, and a first nitrogen-substituted ring compound. Additionally, A and B are each selected from the group consisting essentially of hydrogen, substituted phenyl, and substituted naphthyl, provided that at least one of A or B is substituted phenyl or substituted naphthyl. Also, any substituent of any substituted phenyl or substituted naphthyl at A or B is selected from the group consisting essentially of hydrogen, a second stable organic radical, a heterocyclic group, halogen, a second nitrogen-substituted group, and a second nitrogen-substituted ring compound, provided that at least one substituent of at least one substituted phenyl or substituted naphthyl at either A or B is phenyl, naphthyl, or furyl. The present invention further includes a photochromic article comprising a host material and a photochromic amount of a naphthopyran compound and additionally includes the following 3-(4-biphenylyl)-3-phenyl-8-methoxy-3H-naphtho[2,1b]pyran, 3-(4-biphenylyl)-3-phenyl-3H-naphtho[2,1b]pyran, and 3,3-di(4-biphenylyl)- 8-methoxy-3H-naphtho-[2,1b]pyran.

DETAILED DESCRIPTION OF THE PREFERRED EMBODIMENTS

Novel naphthopyran compounds of the present invention may be represented by graphic formula II as follows:

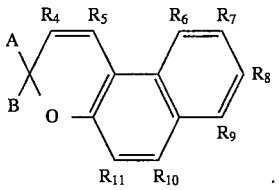

II

A variety of substituents may be placed on the pyran portion and the naphtho portion of the naphthopyran rings. For example, the positions represented in graphic formula II by $R_4$, $R_5$, $R_6$, $R_7$, $R_8$, $R_9$, $R_{10}$, and $R_{11}$, respectively, may be filled with hydrogen; a stable organic radical, such as alkyl, alkoxy, unsubstituted or substituted phenyl, naphthyl, cycloalkyl, furyl, alkoyl, alkoyloxy, aroyl, aroyloxy; a heterocyclic group; halogen; a nitrogen-substituted group, such as amino or nitro; or a nitrogen-substituted ring compound, such as morpholino, piperidino, or piperazino. Also in graphic formula II, A is hydrogen, a substituted phenyl group, or a substituted naphthyl group, and B is hydrogen, a substituted phenyl group, or a substituted naphthyl group, provided that at least one of A and B is substituted phenyl or substituted naphthyl. The substituents of any phenyl or naphthyl group or groups at A or B are selected from the following: a stable organic radical, such as alkyl, alkoxy, unsubstituted or substituted phenyl, naphthyl, cycloalkyl, furyl, alkoyl, alkoyloxy, aroyl, aroyloxy; a heterocyclic group; halogen; a nitrogen-substituted group, such as amino or nitro; and a nitrogen-substituted ring compound, such as morpholino, piperidino, or piperazino; provided that at least one substituent of at least one substituted phenyl or substituted naphthyl at either A or B is phenyl, naphthyl or furyl.

The naphthopyran compounds represented by graphic formula II are derivatives of 3,3-aryl-disubstituted-aryl chromenes. These naphthopyran compounds exhibit a surprising and highly desirable bathychromic shift of the maximum activated wavelength. The bathychromic shift exhibited by the inventive naphthopyran compounds provide photochromic species which turn orange, reddish-orange or purple when activated by solar radiation or an ultraviolet radiation source.

It has been found desirable to produce photochromic compounds with maximum activated wavelengths approaching 500 nanometers. Photochromic compounds with maximum activated wavelengths near 500 nanometers change from original states of color to deep shades of orange, reddish-orange or red when activated by ultraviolet light. The colored forms of the activated photochromic compounds fade to the original, unactivated colored states at ambient temperatures when isolated from the ultraviolet light. Photochromic compounds that turn deep shades of orange, reddish orange, or red when activated are hereinafter referred to as "intense photochromes" for purposes of this disclosure only.

The inventive naphthopyrans represented by graphical equation II, especially the intense photochromes, exhibit a deeper color and a larger bathochromic shift in the visible spectrum of the activated form as compared to existing naphthopyrans. Indeed, the inventive naphthopyrans represented by graphical equation II, especially the intense photochromes, approach a maximum activated wavelength of 500 nanometers; exhibit deep shades of orange, reddish orange, or purple; and include an acceptable fade characteristic.

The inventive intense photochromes may be blended with one or more other photochromic compounds of different maximum activation wavelengths from that of the inventive intense photochromes to make photochromic mixtures. Preferably, the other photochromic compounds turn colors other than orange, reddish orange and purple when activated with ultraviolet light. In one embodiment, one or more of the inventive intense photochromes is preferably blended with another photochromic compound which has a different maximum activation wavelength and which turns blue when activated with ultraviolet light to make the photochromic mixture. It has been discovered that photochromic mixtures that include the inventive intense photochromes and blue-turning photochromic compounds change to desirable shades of gray when activated by ultraviolet light, such as that present in sunlight. The photochromic mixtures may be desirably applied to or incorporated within substrates, such as conventional synthetic plastic materials often used for optical elements.

Compounds of graphic formula II above may be prepared by reacting a suitable ketone precursor with lithium acetylide in a tetrahydrofuran solvent. The product of this reaction is then reacted with a suitably substituted 2-naphthol with a catalytic amount of p-toluenesulfonic acid. The resultant material is then purified by recrystallization, column chromatography, or a combination of recrystallization and column chromatography.

A preferred naphthopyran compound, consistent with graphic formula II, is 3-(4-biphenylyl)-3-phenyl-8-methoxy-3H-naphtho[2,1b]pyran that may be represented by graphic formula III below:

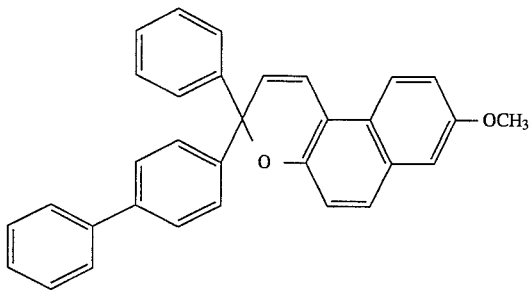

III

When dissolved in chloroform, the compound of graphic formula III, 3-(4-biphenylyl)-3-phenyl-8-methoxy-3H-naphtho[2,1b]pyran, unexpectedly exhibits a maximum activated wavelength of absorption of about 484 nanometers, very near 500 nanometers, when irradiated with ultraviolet light. Additionally, when activated by ultraviolet light, the 3-(4-biphenylyl)-3-phenyl-8-methoxy-3H-naphtho[2,1b] pyran turns a deep shade of orange. Furthermore, the 3-(4-biphenylyl)-3-phenyl-8-methoxy-3H-naphtho[2,1b]pyran desirably blends with blue-turning photochromic compounds, such as a substituted spiroindolino naphthoxazine, to advantageously make one of the photochromic compound blends that changes to an intense shade of gray when activated by ultraviolet radiation.

Compounds represented by graphic formula II may be used in many applications of plastic substrates. For example, compounds represented by graphic formula II may be incorporated into a host material that is applied to or used to make an article. Also, compounds represented by graphic formula II may be incorporated with a host material to make a coating for a suitable substrate. Additionally, compositions, such as photochromic mixtures, that contain one or more of the photochromic compounds represented by graphic formula II may be incorporated into a host material that is applied to or used to make an article. Also, compounds represented by graphic formula II and compositions containing compounds represented by graphic formula II may be incorporated into a coating material that is applied to a host material. A polymerized organic material, such as a synthetic polymerized plastic, is one example of the host material. Examples of the article include plastic optical elements, such as plano and ophthalmic lenses.

Non-exhaustive illustrations of suitable synthetic polymerized plastics include polyacrylate, polycarbonate, polyvinyl alcohol, polyvinyl acetate, polyvinyl chloride, polyurethane, cellulose ester and bis-polyol (allyl carbonate) monomer-based polymer. As used in this disclosure, including the description and the claims, the term bis-polyol (allyl carbonate) monomer and similar phrases are intended to mean and include the named monomer or prepolymer and any related monomer series contained therein. Some non-limiting examples of bis-polyol (allyl carbonate) monomers include ethylene glycol bis(allyl carbonate), diethylene glycol bis(2-methallyl carbonate), diethylene glycol bis(allyl carbonate), propylene glycol bis(2-ethylallyl carbonate), 1-3-propanediol bis(allyl carbonate), 1,3-butanediol bis(allyl carbonate), 1,4-butanediol bis(2,bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate).

The amount of a particular one of the compounds represented by graphic formula II, or a particular composition containing one of the compounds represented by graphic formula II, that is incorporated into the host material or the coating material is defined, for purposes of this disclosure, as the photochromic amount. The photochromic amount is not critical, provided that a sufficient amount to produce a photochromic effect perceptible to the human eye is used. The photochromic amount often depends on the desired intensity of the color on activation of the particular inventive naphthopyran and on the method of incorporation or application of the particular inventive naphthopyran. Typically, the photochromic amount incorporated into or applied to the host material or incorporated into the coating material ranges from about 0.01 to about 20 percent by weight, based on the weight of the host material or the weight of the coating material, as applicable.

The present invention is more particularly described in the following examples which are intended as illustrations only since numerous modifications and variations within the scope of the general formulation will be apparent to those skilled in the art.

EXAMPLE 1

Step 1

Five grams of 4-phenylbenzophenone were placed together with 5 grams of lithium acetylide in 250 milliliters of tetrahydrofuran and stirred for 72 hours. The resultant mixture was poured over ice and diluted with water to form an organic layer and an aqueous layer. The organic layer was separated from the aqueous layer and dried with anhydrous sodium sulfate. The dried organic layer was evaporated to obtain a solid material. The solid material was then triturated with acetone. Nuclear magnetic resonance (NMR) spectroscopy showed the resultant material to be relatively pure (4-biphenylyl)phenyl propargyl alcohol.

Step 2

Two grams of the (4-biphenylyl)phenyl propargyl alcohol were mixed with 1.25 grams of 6-methoxy-2-naphthol in 200 milliliters of benzene. Twenty milligrams of p-toluenesulfonic acid were then added and the mixture was stirred under reflux for 8 hours. The resultant mixture was cooled and washed with 10% aqueous sodium hydroxide. The organic solvent (benzene) was removed using a rotary evaporator. The resulting material was dissolved in a solvent and the solvent solution was cooled to yield a recrystallized product. The recrystallized product was shown to be relatively pure 3-(4-biphenylyl)-3-phenyl-8-methoxy-3H-naphtho[2,1b]pyran by nuclear magnetic resonance (NMR) spectroscopy.

EXAMPLE 2

Step 1

Five grams of 4-phenylbenzophenone were placed together with 5 grams of lithium acetylide in 250 milliliters of tetrahydrofuran and stirred for 72 hours. The resultant mixture was poured over ice and diluted with water to form an organic layer and an aqueous layer. The organic layer was separated from the aqueous layer and dried with anhydrous sodium sulfate. The dried organic layer was evaporated to obtain a solid material. The solid material was then triturated with acetone. Nuclear magnetic resonance (NMR) spectroscopy showed the resultant material to be relatively pure (4-biphenylyl)phenyl propargyl alcohol.

Step 2

Two grams of the (4-biphenylyl)phenyl propargyl alcohol were mixed with 1.25 grams of 2-naphthol in 200 milliliters of benzene. Twenty milligrams of p-toluenesulfonic acid were then added and the mixture was stirred under reflux for 8 hours. The resultant mixture was then cooled and washed with 10% aqueous sodium hydroxide. The organic solvent (benzene) was removed using a rotary evaporator. The resulting material was dissolved in a solvent and the solvent solution was cooled to yield a recrystallized product. The recrystallized product was shown to be relatively pure 3-(4-biphenylyl)-3-phenyl-3H-naphtho-[2,1b]pyran by nuclear magnetic resonance (NMR) spectroscopy.

EXAMPLE 3

Step 1

Five grams of bis-(4-biphenyl)ketone were placed together with 5 grams of lithium acetylide in 250 milliliters of tetrahydrofuran and stirred for 72 hours. The resultant mixture was poured over ice and diluted with water to form an organic layer and an aqueous layer. The organic layer was separated from the aqueous layer and dried with anhydrous sodium sulfate. The dried organic layer was evaporated to obtain a solid material. The solid material was then triturated with acetone. Nuclear magnetic resonance (NMR) spectroscopy showed the resultant material to be relatively pure bis-(4-biphenylyl) propargyl alcohol.

Step 2

Two grams of the bis-(4-biphenylyl) propargyl alcohol were mixed with 1.04 grams of 6-methoxy-2-naphthol in 200 milliliters of benzene. Twenty milligrams of p-toluenesulfonic acid were then added and the mixture was stirred under reflux for 8 hours. The resultant mixture was then cooled and washed with 10% aqueous sodium hydroxide. The organic solvent (benzene) was removed using a rotary evaporator. The resulting material was dissolved in a solvent and the solvent solution was cooled to yield a recrystallized product. The recrystallized product was shown to be relatively pure 3,3-di(4-biphenylyl)-8-methoxy-3H-naphtho-[2,1b]pyran by nuclear magnetic resonance (NMR) spectroscopy.

COMPARATIVE EXAMPLE 1

Step 1

Five grams of benzophenone were placed together with 5 grams of lithium acetylide in 250 milliliters of tetrahydrofuran and stirred for 72 hours. The resultant mixture was poured over ice and diluted with water to form an organic layer and an aqueous layer. The organic layer was separated from the aqueous layer and dried with anhydrous sodium sulfate. The dried organic material was evaporated to obtain a solid material. The solid material was triturated with acetone. Nuclear magnetic resonance (NMR) spectroscopy showed the resultant material to be relatively pure diphenyl propargyl alcohol.

Step 2

Two grams of the diphenyl propargyl alcohol were mixed with 1.71 grams of 6-methoxy-2-naphthol in 200 milliliters of benzene. Twenty milligrams of p-toluenesulfonic acid were then added and the mixture was stirred under reflux for 8 hours. The resultant mixture was cooled and washed with 10% aqueous sodium hydroxide. The organic solvent (benzene) was removed using a rotary evaporator. The resulting material was dissolved in a solvent and the solvent solution was cooled to yield a recrystallized product. The recrystallized product was shown to be relatively pure 3,3-diphenyl-8-methoxy-3H-naphtho-[2,1b]pyran by nuclear magnetic resonance NMR spectroscopy.

The photochromic compounds formed in Example 1 (3-(4-biphenylyl)-3-phenyl-8-methoxy-3 H-naphtho[2,1b] pyran), Example 2 (3-(4-biphenylyl)-3-phenyl-3H-naphtho-[2,1b]pyran), Example 3 (3,3-di(4-biphenylyl)-8-methoxy-3H-naphtho-[2,1b]pyran) and Comparative Example 1 (3,3-diphenyl-8-methoxy-3H-naphtho-[2,1b]pyran), along with the Comparative Example 2 purchased sample of 3,3-diphenyl-3H-naphtho-[2,1b]pyran, were each dissolved in chloroform in separate containers.

Each of the chloroform-dissolved photochromic compounds were then irradiated with ultraviolet light of maximum wavelength of 350 manometers and measured for maximum absorption wavelength, $\lambda_{max}$. The fade time, $T_{1/2}$, was then determined for each of the irradiated compounds. The fade time for a particular chloroform-dissolved photochromic compound is defined as the time interval, at room temperature (72° F.), for the absorbance of the activated form of the chloroform-dissolved photochromic compound to decrease to one half of the maximum absorbance, after the photochromic compound is isolated from the activating source of ultraviolet light. The maximum absorption wavelength and fade time determined for each of the irradiated photochromic compound are presented in Table 1:

TABLE 1

| | $\lambda_{max}$ | $T_{1/2}$ |
|---|---|---|
| EXAMPLE | | |
| 1 | 484 nm | 25 seconds |
| 2 | 454 nm | 13 seconds |
| 3 | 492 nm | 18 seconds |
| COMPARATIVE EXAMPLE | | |
| 1 | 472 nm | 28 seconds |
| 2 | 434 nm | 13 seconds |

Comparative Example 2: Purchased 3,3-diphenyl-3H-naphtho-[2,1b]pyran

The values presented in Table 1 illustrate that the 3-(4-biphenylyl)-3-phenyl-3H-naphtho[2,1b]pyran of Example 2 has a longer maximum wavelength of activation than the 3,3-diphenyl-3H-naphtho-[2,1b]pyran of Comparative Example 2. The Table 1 values also illustrate that the 3-(4-biphenylyl)-3-phenyl-8-methoxy-3H-naphtho[2,1b] pyran of Example 1 and the 3,3-di(4-biphenylyl)-8-methoxy-3H-naphtho[2,1b]pyran of Example 3 each have longer wavelengths of activation than the 3,3-diphenyl-8-methoxy-3H-naphtho[2,1b]pyran of Comparative Example 1. The longer maximum wavelengths of activation of the 3-(4-biphenylyl)-3-phenyl-8-methoxy-3H-naphtho[2,1b]pyran of Example 1, of the 3-(4-biphenylyl)-3-phenyl-3H-naphtho[2, 1b]pyran of Example 2, and the 3,3-di(4-biphenylyl)-8-methoxy-3H-naphtho[2,1b]pyran of Example 3 are desirable characteristics for photochromic compounds.

Although the present invention has been described with reference to preferred embodiments, workers skilled in the art will recognize that changes may be made in form and detail without departing from the spirit and scope of the invention.

What is claimed is:

1. A photochromic article comprising a host material and a photochromic amount of a naphthopyran compound, the naphthopyran compound represented by the formula:

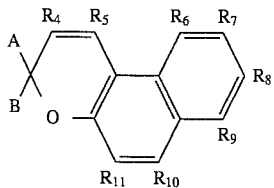

wherein, $R_4$, $R_5$, $R_6$, $R_7$, $R_8$, $R_9$, $R_{10}$, and $R_{11}$ are each selected from the group consisting of hydrogen, alkyl, alkoxy, and cycloalkyl;

A and B are each selected from the group consisting of hydrogen, unsubstituted or substituted phenyl and unsubstituted or substituted naphthyl, provided that at least one of A or B is substituted phenyl or substituted naphthyl; and any substituent of any substituted phenyl or substituted naphthyl at A or B is selected from the group consisting of phenyl, naphthyl, alkyl, alkoxy, and cycloalkyl, provided that at least one substituent of at least one substituted phenyl or substituted naphthyl at either A or B is phenyl or naphthyl.

2. The photochromic article of claim 1 wherein the host material is made of a polymerized organic compound.

3. The photochromic article of claim 2 wherein the polymerized organic compound is selected from the group consisting essentially of polyacrylate, polycarbonate, polyvinyl alcohol, polyvinyl acetate, polyvinyl chloride, polyurethane, cellulose ester, and a polymer of bis-polyol(allyl carbonate) monomer.

4. The photochromic article of claim 1 wherein the naphthopyran is present in an amount of from about 0.01 to about 20 percent by weight, based on the weight of the host material.

5. The article of claim 1 wherein the article is an optical element.

6. The article of claim 5 wherein the optical element is a lens.

7. The article of claim 1 wherein the napthopyran compound is 3-(4-biphenylyl)-3-phenyl-8-methoxy-3H-naphtho[2,1b]pyran.

8. The article of claim 7 wherein the article is a coating for a suitable substrate.

9. The article of claim 1 wherein the napthopyran compound is 3-(4-biphenylyl)-3-phenyl-3H-naphtho[2,1b]pyran.

10. The article of claim 9 wherein the article is a coating for a suitable substrate.

11. The article of claim 1 wherein the napthopyran compound is 3,3-di(4-biphenylyl)-8-methoxy-3H-naphtho[2,1b]pyran.

12. The article of claim 11 wherein the article is a coating for a suitable substrate.

13. The article of claim 1 wherein the article is a coating for a suitable substrate.

14. The article of claim 1, the article further comprising one or more additional photochromic compounds, the naphthopyran compound and the additional photochromic compounds having different maximum wavelengths of activation.

15. The article of claim 14 wherein the article is a coating for a suitable substrate.

16. The article of claim 14 wherein the napthopyran compound is 3-(4-biphenylyl)-3-phenyl-8-methoxy-3H-naphtho[2,1b]pyran.

17. The article of claim 16 wherein the article is an optical element.

18. The article of claim 17 wherein the optical element is a lens.

19. The article of claim 14 wherein the napthopyran compound is 3-(4-biphenylyl)-3-phenyl-3H-naphtho[2,1b]pyran.

20. The article of claim 19 wherein the article is an optical element.

21. The article of claim 20 wherein the optical element is a lens.

22. The article of claim 14 wherein the napthopyran compound is 3,3-di(4-biphenylyl)-8-methoxy-3H-naphtho[2,1b]pyran.

23. The article of claim 22 wherein the article is an optical element.

24. The article of claim 23 wherein the optical element is a lens.

* * * * *

UNITED STATES PATENT AND TRADEMARK OFFICE
CERTIFICATE OF CORRECTION

PATENT NO. : 5,531,935
DATED : JULY 2, 1996
INVENTOR(S) : FRANK J. HUGHES, EDWARD A. TRAVNICEK

It is certified that error appears in the above-indentified patent and that said Letters Patent is hereby corrected as shown below:

Col. 1, line 67, delete "4,93 1,221", insert --4,931,221--

Col. 2, line 13, delete "R2", insert --$R_2$--

Col. 2, line 18, delete "R2", insert --$R_2$--

Col. 2, line 32, delete "R2", insert --$R_2$--

Signed and Sealed this

Twenty-second Day of October, 1996

BRUCE LEHMAN

*Attest:*

*Attesting Officer*          Commissioner of Patents and Trademarks